United States Patent
Nordberg et al.

(10) Patent No.: US 9,316,413 B2
(45) Date of Patent: Apr. 19, 2016

(54) SELECTABLE EFFICIENCY VERSUS COMFORT FOR MODULATING FURNACE

(75) Inventors: Timothy J. Nordberg, Plymouth, MN (US); Brent Chian, Plymouth, MN (US); Douglas D. Bird, Little Canada, MN (US); Michael W. Schultz, Elk River, MN (US); Peter M. Anderson, St. Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 2089 days.

(21) Appl. No.: 12/137,212

(22) Filed: Jun. 11, 2008

(65) Prior Publication Data

US 2009/0308372 A1    Dec. 17, 2009

(51) Int. Cl.
| | |
|---|---|
| F23N 5/00 | (2006.01) |
| F24H 9/20 | (2006.01) |
| F23N 3/08 | (2006.01) |
| F23N 5/02 | (2006.01) |

(52) U.S. Cl.
CPC .............. F24H 9/2085 (2013.01); F23N 3/082 (2013.01); *F23N 2023/44* (2013.01)

(58) Field of Classification Search
USPC ............................................ 126/116 A, 99 R
See application file for complete search history.

(56) References Cited

U.S. PATENT DOCUMENTS

| | | | |
|---|---|---|---|
| 3,472,452 A * | 10/1969 | Beeston, Jr. .................. 236/9 R |
| 4,251,025 A | 2/1981 | Bonne et al. | |
| 4,266,599 A * | 5/1981 | Saunders et al. ............... 165/239 |
| 4,314,441 A | 2/1982 | Yannone et al. | |
| 4,329,138 A | 5/1982 | Riordan | |
| 4,334,855 A | 6/1982 | Nelson | |
| 4,340,355 A | 7/1982 | Nelson et al. | |
| 4,373,897 A | 2/1983 | Torborg | |
| 4,421,268 A * | 12/1983 | Bassett et al. .................... 236/10 |
| 4,435,149 A * | 3/1984 | Astheimer ....................... 431/12 |
| 4,439,139 A | 3/1984 | Nelson et al. | |
| 4,502,625 A | 3/1985 | Mueller | |
| 4,577,278 A * | 3/1986 | Shannon ....................... 700/210 |
| 4,684,060 A | 8/1987 | Adams et al. | |
| 4,688,547 A | 8/1987 | Ballard et al. | |
| 4,703,795 A | 11/1987 | Beckey | |
| 4,708,636 A | 11/1987 | Johnson | |
| 4,729,207 A | 3/1988 | Dempsey et al. | |
| 4,767,104 A | 8/1988 | Plesinger | |

(Continued)

OTHER PUBLICATIONS

Honeywell, "45.801.175, Amplification Gas/Air Module for VK4105R/VK8105R Gas Controls," Production Handbook, 8 pages, prior to Oct. 18, 2006.

(Continued)

*Primary Examiner* — Jorge Pereiro
(74) *Attorney, Agent, or Firm* — Seager, Tufte & Wickhem, LLP

(57) ABSTRACT

A furnace controller for a modulating furnace that helps provide a balance between energy efficiency and occupant comfort across various burner firing rates and/or across various circulating blower speeds. In some cases, the furnace controller can be configured to permit a user to customize operation of the furnace in accordance with their particular needs and/or desires with respect to efficiency and comfort. A selection may be made between an energy efficiency setting and a user comfort setting. Then, a plenum parameter such as a discharge air temperature (DAT) or discharge air flow (DAF) may be regulated in accordance with the selected setting.

18 Claims, 7 Drawing Sheets

(56) References Cited

U.S. PATENT DOCUMENTS

| | | | |
|---|---|---|---|
| 4,819,587 A | 4/1989 | Tsutsui et al. | |
| 4,892,245 A | 1/1990 | Dunaway et al. | |
| 4,915,615 A | 4/1990 | Kawamura et al. | |
| 4,941,609 A * | 7/1990 | Bartels et al. | 236/78 D |
| 5,026,270 A | 6/1991 | Adams et al. | |
| 5,248,083 A | 9/1993 | Adams et al. | |
| 5,259,445 A * | 11/1993 | Pratt et al. | 165/241 |
| 5,307,990 A | 5/1994 | Adams et al. | |
| 5,331,944 A | 7/1994 | Kujawa et al. | |
| 5,340,028 A | 8/1994 | Thompson | |
| 5,347,981 A | 9/1994 | Southern et al. | |
| 5,408,986 A | 4/1995 | Bigham | |
| 5,485,953 A * | 1/1996 | Bassett et al. | 236/49.3 |
| 5,520,533 A | 5/1996 | Vrolijk | |
| 5,524,556 A * | 6/1996 | Rowlette et al. | 110/162 |
| 5,539,633 A * | 7/1996 | Hildebrand et al. | 700/32 |
| 5,590,642 A | 1/1997 | Borgeson et al. | |
| 5,601,071 A * | 2/1997 | Carr et al. | 126/116 A |
| 5,616,995 A * | 4/1997 | Hollenbeck | 318/432 |
| 5,630,408 A | 5/1997 | Versluis | |
| 5,666,889 A * | 9/1997 | Evens et al. | 110/190 |
| 5,676,069 A * | 10/1997 | Hollenbeck | 110/147 |
| 5,680,021 A * | 10/1997 | Hollenbeck | 318/432 |
| 5,682,826 A * | 11/1997 | Hollenbeck | 110/147 |
| 5,720,231 A | 2/1998 | Rowlette et al. | |
| 5,732,691 A | 3/1998 | Maiello et al. | |
| 5,791,332 A | 8/1998 | Thompson et al. | |
| 5,806,440 A | 9/1998 | Rowlette et al. | |
| 5,819,721 A | 10/1998 | Carr et al. | |
| 5,860,411 A | 1/1999 | Thompson et al. | |
| 5,865,611 A | 2/1999 | Maiello | |
| 5,993,195 A | 11/1999 | Thompson | |
| 6,000,622 A | 12/1999 | Tonner et al. | |
| 6,109,255 A | 8/2000 | Dieckmann et al. | |
| 6,254,008 B1 | 7/2001 | Erickson et al. | |
| 6,257,870 B1 | 7/2001 | Hugghins et al. | |
| 6,283,115 B1 | 9/2001 | Dempsey et al. | |
| 6,321,744 B1 | 11/2001 | Dempsey et al. | |
| 6,354,327 B1 | 3/2002 | Mayhew | |
| 6,377,426 B2 | 4/2002 | Hugghins et al. | |
| 6,571,817 B1 | 6/2003 | Bohan, Jr. | |
| 6,705,533 B2 | 3/2004 | Casey et al. | |
| 6,749,423 B2 | 6/2004 | Fredricks et al. | |
| 6,758,909 B2 | 7/2004 | Jonnalagadda et al. | |
| 6,764,298 B2 | 7/2004 | Kim et al. | |
| 6,793,015 B1 | 9/2004 | Brown et al. | |
| 6,846,514 B2 | 1/2005 | Jonnalagadda et al. | |
| 6,866,202 B2 | 3/2005 | Sigafus et al. | |
| 6,880,548 B2 | 4/2005 | Schultz et al. | |
| 6,918,756 B2 | 7/2005 | Fredricks et al. | |
| 6,923,643 B2 | 8/2005 | Schultz et al. | |
| 6,925,999 B2 | 8/2005 | Hugghins et al. | |
| 7,055,759 B2 | 6/2006 | Wacker et al. | |
| 7,101,172 B2 | 9/2006 | Jaeschke | |
| 7,111,503 B2 | 9/2006 | Brumboiu et al. | |
| 7,130,719 B2 | 10/2006 | Ehlers et al. | |
| 7,191,826 B2 * | 3/2007 | Byrnes et al. | 318/400.08 |
| 7,228,693 B2 * | 6/2007 | Helt | 62/176.6 |
| 7,293,718 B2 * | 11/2007 | Sigafus et al. | 236/11 |
| 7,584,021 B2 * | 9/2009 | Bash et al. | 700/276 |
| 7,693,809 B2 * | 4/2010 | Gray | 706/45 |
| 2002/0155404 A1 | 10/2002 | Casey et al. | |
| 2002/0155405 A1 | 10/2002 | Casey et al. | |
| 2003/0011342 A1 | 1/2003 | Eichorn | |
| 2004/0043345 A1 * | 3/2004 | Jaeschke | 431/18 |
| 2005/0150238 A1 * | 7/2005 | Helt | 62/176.6 |
| 2005/0155404 A1 | 7/2005 | Geho et al. | |
| 2005/0159844 A1 | 7/2005 | Sigafus et al. | |
| 2006/0105279 A1 | 5/2006 | Munsterhuis et al. | |
| 2007/0003891 A1 * | 1/2007 | Jaeschke | 431/19 |
| 2007/0068184 A1 * | 3/2007 | Mueller et al. | 62/260 |
| 2007/0239316 A1 * | 10/2007 | Jelinek et al. | 700/276 |
| 2008/0098760 A1 * | 5/2008 | Seefeldt | 62/238.7 |
| 2008/0121729 A1 * | 5/2008 | Gray | 236/51 |
| 2008/0127962 A1 * | 6/2008 | Thompson | 126/116 A |
| 2008/0127963 A1 * | 6/2008 | Thompson | 126/116 A |
| 2008/0140259 A1 * | 6/2008 | Bash et al. | 700/278 |
| 2008/0217419 A1 * | 9/2008 | Ehlers et al. | 236/44 C |
| 2009/0293521 A1 * | 12/2009 | Major et al. | 62/228.1 |
| 2010/0065245 A1 * | 3/2010 | Imada et al. | 165/59 |

OTHER PUBLICATIONS

Honeywell, "VK41..R/VK81..R Series, Gas Controls with Integrated Gas/Air Module for Combined Valve and Ignition System," Instruction Sheet, 6 pages, prior to Oct. 18, 2006.

http://www.regal-beloit.com/gedraft.html, "Welcome to GE Commercial Motors by Regal-Beloit," 1 page, printed Apr. 26, 2006.

Lennox, "G61MPV Series Units," Installation Instructions, 2 pages, Oct. 2006.

* cited by examiner

SELECTABLE EFFICIENCY VERSUS COMFORT FOR MODULATING FURNACE

TECHNICAL FIELD

This disclosure relates generally to furnaces such as modulating furnaces that have a modulating firing rate and a variable speed circulating air blower.

BACKGROUND

Many homes and other buildings rely upon furnaces to provide heat during cool and/or cold weather. Typically, a furnace employs a burner that burns a fuel such as natural gas, propane, oil or the like, and provides heated combustion gases to the interior of a heat exchanger. The combustion gases typically proceed through the heat exchanger, are collected by a collector box, and then exhausted outside of the building via a vent or the like. In some cases, a combustion blower is provided to pull in combustion air into the burner, pull the combustion gases through the heat exchanger into the collector box, and push the combustion gases out the vent. At the same time, a circulating air blower typically forces return air from the building, and in some cases ventilation air from outside of the building, over or through the heat exchanger, thereby heating the air. The heated air is subsequently routed throughout the building via a duct system. A return duct system is typically employed to return air from the building to the furnace to be re-heated and then re-circulated.

In order to provide improved energy efficiency, some furnaces may be considered as having two or more stages, i.e., they can operate at two or more different burner firing rates, depending on how much heat is needed within the building. Some furnaces are known as modulating furnaces, because they can potentially operate at a number of different firing rates and/or across a range of firing rates. The firing rate of the furnace typically dictates the amount of gas and air that is required by the burner, as well as the heat that is produced by the burner.

To maintain energy efficiency across the various burner firing rates, the circulating air blower is sometimes regulated in accordance with burner firing rate to maintain a constant discharge air temperature, i.e., a constant temperature of the heated air being supplied to the building. When so regulated, the speed of the circulating air blower may be increased at higher firing rates and decreased at lower burner firing rates in order to maintain a constant discharge air temperature at the output of the furnace. While this can increase the overall energy efficiency of the furnace, relatively high circulating air blower speeds can negatively impact occupant comfort by creating a wind chill effect in the building, i.e., a feeling of draftiness caused by relatively high air flow in the building.

SUMMARY

The disclosure relates generally to furnaces such as modulating furnaces that have a modulating firing rate and a variable speed circulating air blower. To help provide a balance between energy efficiency and occupant comfort across various burner firing rates, and in one illustrative example, the circulating air blower may be regulated in accordance with burner firing rate such that a non-constant discharge air temperature is produced at the output of the furnace. In one example, the speed of the circulating air blower may be regulated such that the discharge air temperature increases with increased burner firing rates. When so provided, at higher firing rates, the speed of the circulating air blower may be less than if the discharge air temperature were maintained at a constant temperature, which can help reduce wind chill effect in the building at higher firing rates. In some cases, the circulating air blower may be operated at a particular rate while the burner firing rate may be regulated to obtain a non-constant discharge air temperature.

The discharge air temperature can be determined or estimated by, for example, providing a discharge air temperature sensor in the plenum of the furnace, providing a model or function that estimates the discharge air temperature based on characterization or calibration data of the discharge air temperature versus burner firing rate, or in any other suitable manner. The relationship between the determined or estimated discharge air temperature and the burner firing rate may take on any suitable form or function, such as function $DAT = f(BFR)$, where DAT is the Discharge Air Temperature and BFR is the burner firing rate. It is contemplated that the function $f$ (BFR) may be, for example, a linear function with a non-zero slope, a piecewise linear function, an exponential function, or any other suitable function or relationship as desired.

When discharge air temperature is not available or difficult to estimate, any other suitable plenum parameter may be used including, for example, the discharge air flow (e.g. cubic feet per minute—CFM) through the plenum. In this example, the relationship may be defined as $DAF = g (BFR)$, where DAF is the Discharge Air Flow. The discharge air flow (DAF) can be determined or estimated by, for example, using an air flow sensor, a pressure sensor, a sensed speed of the circulating air blower, using a model or function that estimates the discharge air flow based on characterization or calibration data of the discharge air flow and, for example, the commanded circulating air blower speed, or in any other suitable manner.

In some instances, a user may be permitted to select a preference between energy efficiency and occupant comfort. That is, in some instances, a furnace controller may be configured to permit a user to customize operation of the furnace in accordance with their particular needs and/or desires with respect to efficiency and comfort. For example, and in an illustrative but non-limiting example, a selection may be made between an energy efficiency setting and a user comfort setting. The selection may be, for example, selecting either an energy efficiency setting or a user comfort setting. Alternatively, the selection may be made along a sliding scale, essentially biasing the control algorithm toward energy efficiency or comfort by a selected amount. In some cases, the preference selected by the user may offset or otherwise change the relationship discussed above between the plenum parameter (e.g. determined or estimated discharge air temperature, discharge air flow, etc.) and the burner firing rate. Then, the plenum parameter may be regulated in accordance with the selected setting.

The above summary is not intended to describe each disclosed embodiment or every implementation. The Figures, Description and Examples which follow more particularly exemplify these embodiments.

BRIEF DESCRIPTION

The disclosure may be more completely understood in consideration of the following detailed description of various embodiments in connection with the accompanying drawings, in which.

Figure 1:
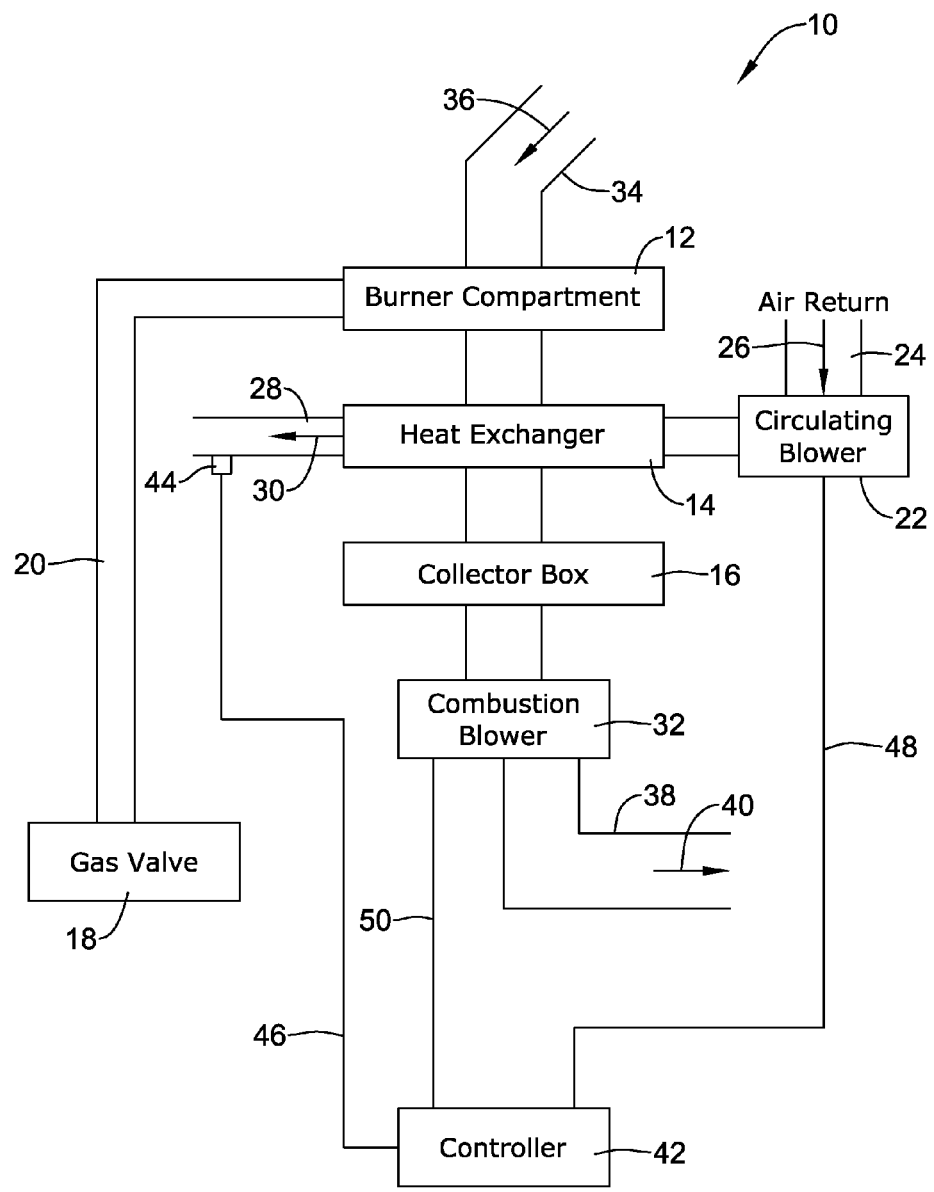
FIG. 1 is a schematic diagram of an illustrative but non-limiting furnace.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a schematic diagram of an illustrative but non-limiting furnace 10, which may include additional components not described herein. The primary components of furnace 10 include a burner compartment 12, a heat exchanger 14 and a collector box 16. An electrically or pneumatically regulated gas valve 18 provides fuel such as natural gas or propane, from a source (not illustrated) to burner compartment 12 via a gas line 20. Burner compartment 12 burns the fuel provided by gas valve 18, and provides heated combustion products to heat exchanger 14. The heated combustion products pass through heat exchanger 14 and exit into collector box 16, and are ultimately exhausted to the exterior of the building or home in which furnace 10 is installed by combustion blower 32.

In the illustrative furnace, a circulating blower 22 accepts return air from the building or home's return ductwork 24 as indicated by arrow 26, and blows the return air through heat exchanger 14, thereby heating the air. The heated air exits heat exchanger 14 and enters the building or home's conditioned air ductwork 28, traveling in a direction indicated by arrow 30. For enhanced thermal transfer and efficiency, the heated combustion products may pass through heat exchanger 14 in a first direction while circulating blower 22 forces air through heat exchanger 14 in a second direction. In some instances, for example, the heated combustion products may pass generally downwardly through heat exchanger 14 while the air blown through by circulating blower 22 may pass upwardly through heat exchanger 14, but this is not required.

In some cases, as illustrated, a combustion blower 32 may be positioned downstream of collector box 16 and may pull combustion gases through heat exchanger 14 and collector box 16. Combustion blower 32 may be considered as pulling combustion air into burner compartment 12 through combustion air source 34 to provide an oxygen source for supporting combustion within burner compartment 12. The combustion air may move in a direction indicated by arrow 36. Combustion products may then pass through heat exchanger 14, into collector box 16, and are ultimately exhausted through the flue 38 in a direction indicated by arrow 40.

Furnace 10 may include a controller 42 that can be configured to control various components of furnace 10, including, for example, the ignition of fuel by an ignition element (not shown), the speed and operation times of combustion blower 32, and the speed and operation times of circulating fan or blower 22. In addition, controller 42 can be configured to monitor and/or control various other aspects of the system including any damper and/or diverter valves connected to the supply air ducts, any sensors used for detecting temperature and/or airflow, any sensors used for detecting filter capacity, and any shut-off valves used for shutting off the supply of gas to gas valve 18. In the control of other gas-fired appliances such as water heaters, for example, controller 42 can be tasked to perform other functions such as water level and/or temperature detection, as desired.

In some instances, controller 42 can include an integrated furnace controller (IFC) configured to communicate with one or more thermostat controllers or the like (not shown) for receiving heat request signals from one or more locations within the building or structure. It should be understood, however, that controller 42 may be any suitable controller, and may in some cases, be configured to provide connectivity to any number of a wide range of platforms and/or standards, if desired.

In some cases, furnace 10 may include a sensor 44 that is disposed within or in contact with the conditioned air, such as in the plenum or in ductwork 28. Sensor 44 may be any suitable sensor that can detect and/or measure a plenum parameter. Examples of plenum parameters include, but are not limited to, plenum air temperature (sometimes referred to as DAT, or Discharge Air Temperature), plenum air flow (sometimes referred to as DAF, or Discharge Air Flow) often expressed as a volumetric air flow measurement that may be given in CFM (cubic feet per minute), or any other suitable plenum parameter, as desired. Sensor 44 may provide a sensed value to controller 42 via an electrical line 46, or may be wireless as desired.

In some instances, controller 42 may provide commands to circulating blower 22 via an electrical line 48. In some cases, controller 42 may also regulate combustion blower 32 via signals sent via an electrical line 50. In some instances, controller 42 may indirectly regulate the flow of gas provided by a pneumatically controlled gas valve 18 by electrically commanding combustion blower 32 to increase or decrease its speed. The resulting change in combustion gas flow through one or more of burner compartment 12, heat exchanger 14, collector box 16 and combustion blower 32 may be detected and/or measured pneumatically as a pressure or as a pressure drop. The pressure signal may be used to pneumatically regulate gas valve 18, although the pneumatic line(s) is (are) not illustrated in FIG. 1. Alternatively, and in some cases, controller 42 may directly regulate the flow of gas provided by providing a control signal to an electrically controlled gas valve 18, if desired.

To help provide a balance between energy efficiency and occupant comfort across various burner firing rates, circulating blower 22 may be regulated in accordance with burner firing rate and/or burner 12 may be regulated in accordance with circulating air blower speed such that a non-constant discharge air temperature is produced at the output of furnace 10, such as in the furnace plenum or ductwork 28.

In one example, the speed of circulating blower 22 may be regulated by controller 42 such that the discharge air temperature (DAT) increases with increased burner firing rates. When so provided, at higher firing rates, the speed of circulating air blower 22 may be less than if the discharge air temperature were maintained at a constant temperature, which can help reduce wind chill effect in the building at higher firing rates.

The discharge air temperature can be determined or estimated by, for example, reading discharge air temperature sensor 44, providing a model or function that estimates the discharge air temperature based on characterization or calibration data of the discharge air temperature versus burner firing rate, or in any other suitable manner. The relationship between the determined or estimated discharge air temperature and the burner firing rate may take on any suitable form or function, such as function DAT=$f$(BFR), where DAT is the Discharge Air Temperature and BFR is the burner firing rate. It is contemplated that the function $f$ (BFR) may be, for example, a linear function with a non-zero slope, a piecewise linear function, an exponential function, or any other suitable function or relationship as desired.

When discharge air temperature is not available or difficult to estimate, any other suitable plenum parameter may be used including, for example, the discharge air flow (e.g. cubic feet per minute—CFM) through the plenum. In this example, the relationship may be defined as DAF=g (BFR), where DAF is the Discharge Air Flow. The discharge air flow (DAF) can be determined or estimated by, for example, using an air flow sensor, a pressure sensor, a sensed or estimated speed of circulating blower 22, using a model or function that estimates the discharge air flow based on characterization or calibration data of the discharge air flow and, for example, the commanded circulating blower speed, or in any other suitable manner. It is contemplated that the function g (BFR) may be, for example, a linear function with a non-zero slope, a piecewise linear function, an exponential function, or any other suitable function or relationship as desired.

Figure 7:
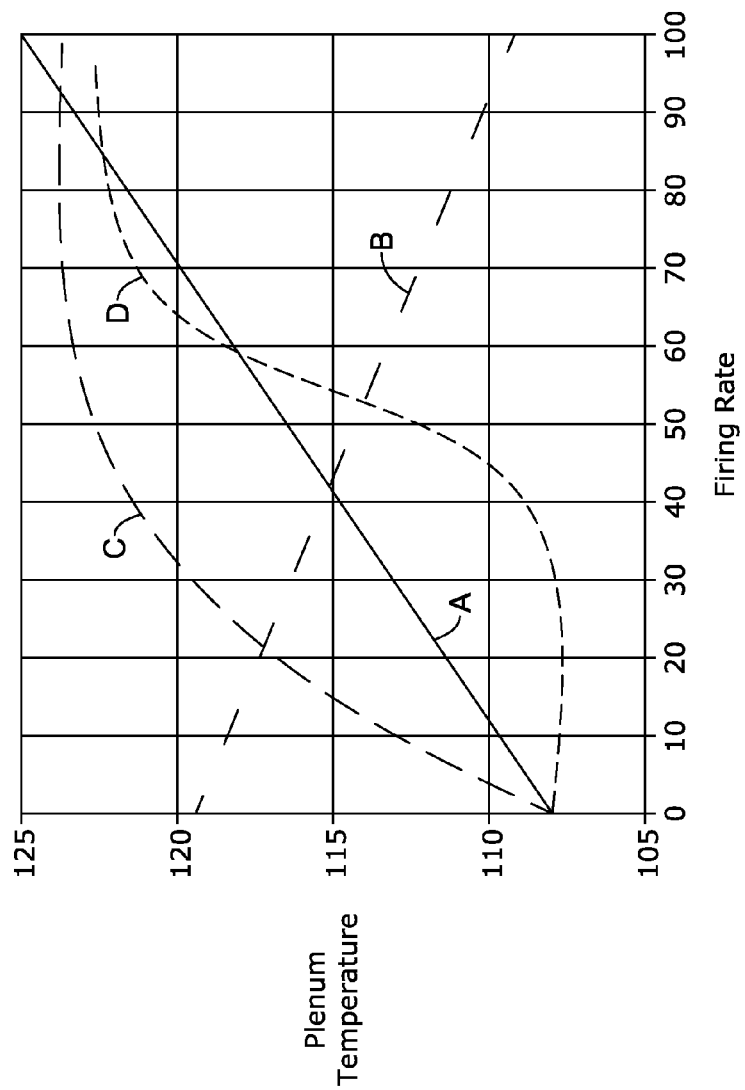
FIG. 7 shows a graph of illustrative relationships between a plenum parameter and burner firing rate.

FIG. 7 shows a graph of some illustrative relationships between a plenum parameter (e.g. determined or estimated discharge air temperature, discharge air flow, etc.) and burner firing rate. The graph shows relationships that are linear with a positive slope (line A), linear with a negative slope (line B), asymptotic (line C), and non linear and non-monotonic (line D). These are only illustrative, and as eluded to above, it is contemplated that any suitable relationship may be defined and used, as desired.

Figure 2:
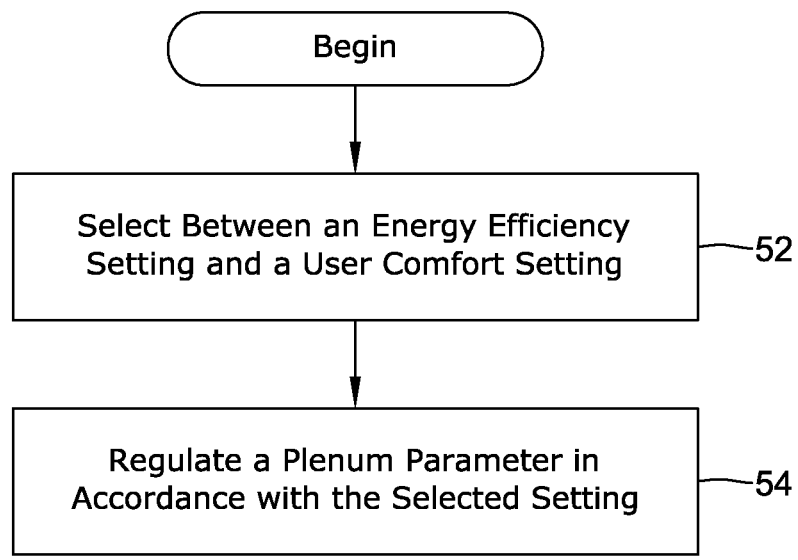
FIGS. 2 through 6 are flow diagrams showing illustrative but non-limiting methods that may be carried out using the furnace of FIG. 1.

FIGS. 2 through 6 are flow diagrams showing illustrative but non-limiting methods that may be carried out using furnace 10. In FIG. 2, control begins at block 52, where a selection is made between an energy efficiency setting and a user comfort setting. In some cases, this setting may be made at the time of furnace installation, and may, for example, involve setting one or more input devices connected to controller 42 (FIG. 1). Examples of suitable input devices include but are not limited to switches, buttons, keys, jumpers, or DIP switches. In some cases, this setting may be user-adjustable, and may represent a software change within controller 42.

In some cases, the selection may involve selecting between either an energy efficiency setting or a user comfort setting. Alternatively, the selection may be made along a sliding scale, essentially biasing the control algorithm implemented by controller 42 toward energy efficiency or comfort by a selected amount. The preference selected by the user may offset or otherwise alter the relationship (see FIG. 7) between the plenum parameter (e.g. determined or estimated discharge air temperature, discharge air flow, etc.) and the burner firing rate.

In some instances, a selection between energy efficiency and user comfort may be made multiple times, corresponding to differing operating conditions. For example, a user may be able to select a preference for energy efficiency at certain burner firing rates and a preference for user comfort at certain other burner firing rates. To illustrate, perhaps a user may select a preference for user comfort at most burner firing rates, but is willing to accept a possible reduction in user comfort in order to achieve an improved energy efficiency when burner 12 is firing at a relatively high or even a maximum firing rate as a high firing rate may be an indication of a low outdoor air temperature.

Next, at block 54, the plenum parameter is regulated in accordance with the setting that was previously selected in block 52. In some cases, controller 42 (FIG. 1) is configured to operate furnace 10 (FIG. 1) in accordance with a predetermined algorithm that may, for example, provide a particular relationship between a firing rate of burner compartment 12 (FIG. 1) and/or a speed of circulating blower 22 (FIG. 1) and a plenum parameter such as a discharge air temperature (DAT) or discharge air flow (DAF). In other words, for a given firing rate, the predetermined algorithm may dictate a particular discharge air temperature (DAT) or discharge air flow (DAF), and controller 42 may alter the speed of circulating blower 22 (FIG. 1) in order to meet the desired discharge air temperature (DAT) or discharge air flow (DAF). In some cases, the predetermined algorithm may dictate a particular discharge air temperature (DAT), and controller 42 may alter the firing rate of burner 12 (FIG. 1) in order to meet the desired discharge air temperature (DAT).

In some cases, the selected setting, i.e., energy efficiency versus user comfort, may cause controller 42 to alter the predetermined algorithm. For example, circulating blower 22 (FIG. 1) may be operated at a blower speed that is either higher or lower than that dictated by the original predetermined algorithm in order to achieve a discharge air temperature (DAT) that is offset or otherwise altered from the discharge air temperature (DAT) that would otherwise be indicated by the predetermined relationship between firing rate and discharge air temperature (DAT). In some cases, burner 12 (FIG. 1) may instead be operated at a firing rate that is either higher or lower than that dictated by the original predetermined algorithm in order to order to achieve a discharge air temperature (DAT) that is offset or otherwise altered from the discharge air temperature (DAT) that would otherwise be indicated by the predetermined relationship between firing rate and discharge air temperature (DAT). In some instances, controller 42 (FIG. 1) may include or be programmed with an Equipment Protection Limit (EPL) that limits how far the circulating blower speed may be altered from a standard or set value.

In some cases, controller 42 (FIG. 1) may include or otherwise be programmed with a particular relationship between an equipment parameter and a plenum parameter. The equipment parameter may, for example, be a blower speed for circulating blower 22 (FIG. 1) or a firing rate for burner 12 (FIG. 1). As noted above, the plenum parameter may be discharge air temperature (DAT) or discharge air flow (DAF), among others. The relationship may be linear with a non-zero slope, although as indicated above, this is not required. It is contemplated that equipment specifics may, in some cases, dictate a non-linear relationship between equipment parameter and a plenum parameter such as discharge air temperature, discharge air flow, and/or the like.

Figure 3:
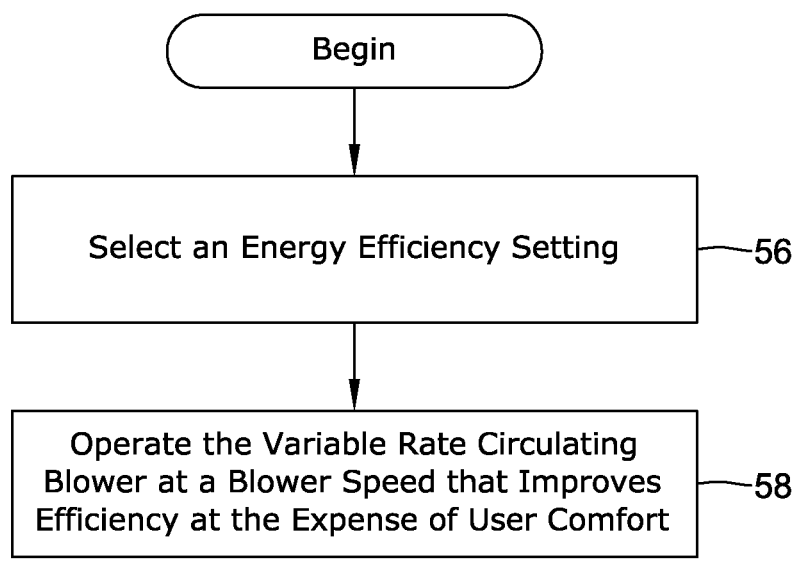

Turning now to FIG. 3, control begins at block 56, where an energy efficiency selection is made. In some cases, this setting may be made at the time of furnace installation, and may, for example, involve setting one or more DIP switches connected to controller 42 (FIG. 1). In some cases, this setting may be user-adjustable, and may represent a software change within controller 42.

At block 58, the circulating blower 22 (FIG. 1) may be operated at a blower speed that improves energy efficiency at the expense of user comfort. In some cases, this may mean operating circulating blower 22 at a higher speed in order to extract more heat from the combustion gases within heat exchanger 14 (FIG. 1), even though perhaps this may cause an occupant to sense a draft within the building as a result of the increased air flow. In some instances, the firing rate may also be altered to improve energy efficiency.

Figure 4:
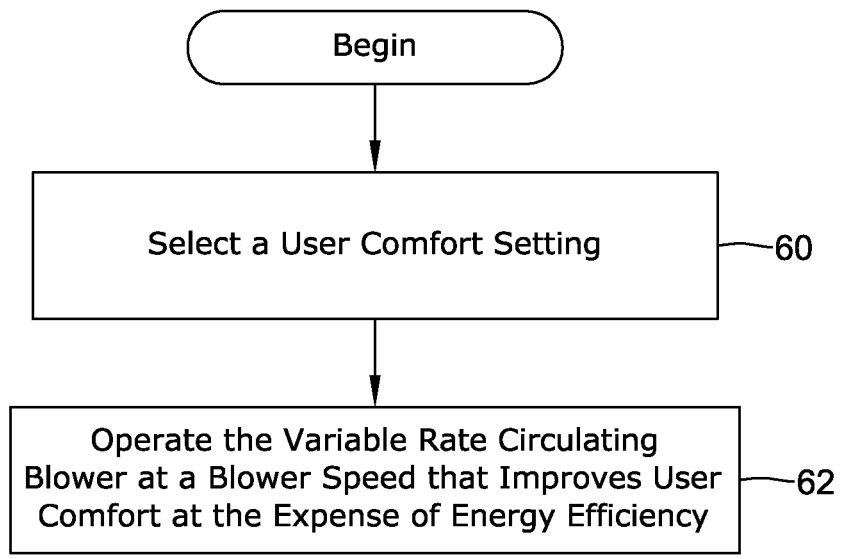

Turning now to FIG. 4, control begins at block 60, where a user comfort selection is made. In some cases, this setting may be made at the time of furnace installation, and may, for example, involve setting one or more DIP switches connected to controller 42 (FIG. 1). In some cases, this setting may be user-adjustable, and may represent a software change within controller 42.

At block 62, the circulating blower 22 (FIG. 1) may be operated at a blower speed that improves user comfort at the expense of energy efficiency. In some cases, for example, this may mean operating circulating blower 22 at a lower speed so that the user does not feel drafts, even though perhaps this may mean that less heat is extracted from the combustion gases within heat exchanger 14 (FIG. 1). In some instances, the firing rate may also be altered to improve user comfort.

Figure 5:
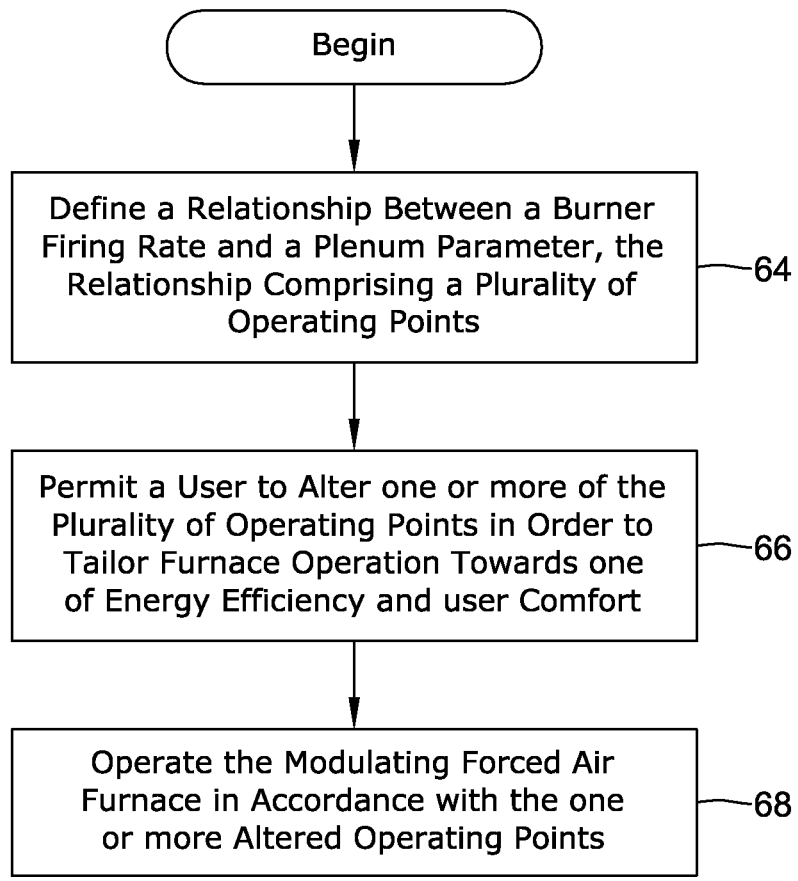

Turning now to FIG. 5, control begins at block 64, where a relationship may be defined between a burner firing rate and a plenum parameter. The relationship may include a plurality of operating points. In some instances, the plenum parameter may be a discharge air temperature (DAT) or a discharge air flow (DAF) measurement, although this is not required. In some cases, the relationship may be programmed or otherwise entered into controller 42 (FIG. 1).

At block 66, a user is permitted to alter one or more of the plurality of operating points in order to tailor operation of furnace 10 (FIG. 1) towards either energy efficiency or user comfort. In some instances, as noted above, optimizing energy efficiency may require some sacrifice of user comfort, and vice versa. In some cases, a user may individually select particular operating points to alter.

In some instances, a user may simply make a selection between energy efficiency and user comfort, and controller 42 (FIG. 1) may determine how to alter the individual operating points (or a general relationship between firing rate and the plenum parameter). As noted above, there may be a linear relationship between firing rate and plenum parameter, but this is not required. In some cases, the altered individual operating points may be considered as being offset from this linear (or other) relationship, and in some cases, the slope of a linear relationship may be altered.

Control passes to block 68, where furnace 10 (FIG. 1) is operated in accordance with the one or more altered operating points. As discussed above, this may mean operating circulating blower 22 (FIG. 1) at a speed that is higher or lower than a speed at which circulating blower 22 would otherwise operate at for a given firing rate. In some cases, this may mean operating burner 12 (FIG. 1) at a firing rate that is higher or lower than a firing rate at which burner 12 would otherwise operate at for a given circulating blower speed. In some instances, the altered operating points may mean adjusting or changing both the speed of circulating blower 22 and the firing rate of burner 12.

Figure 6:
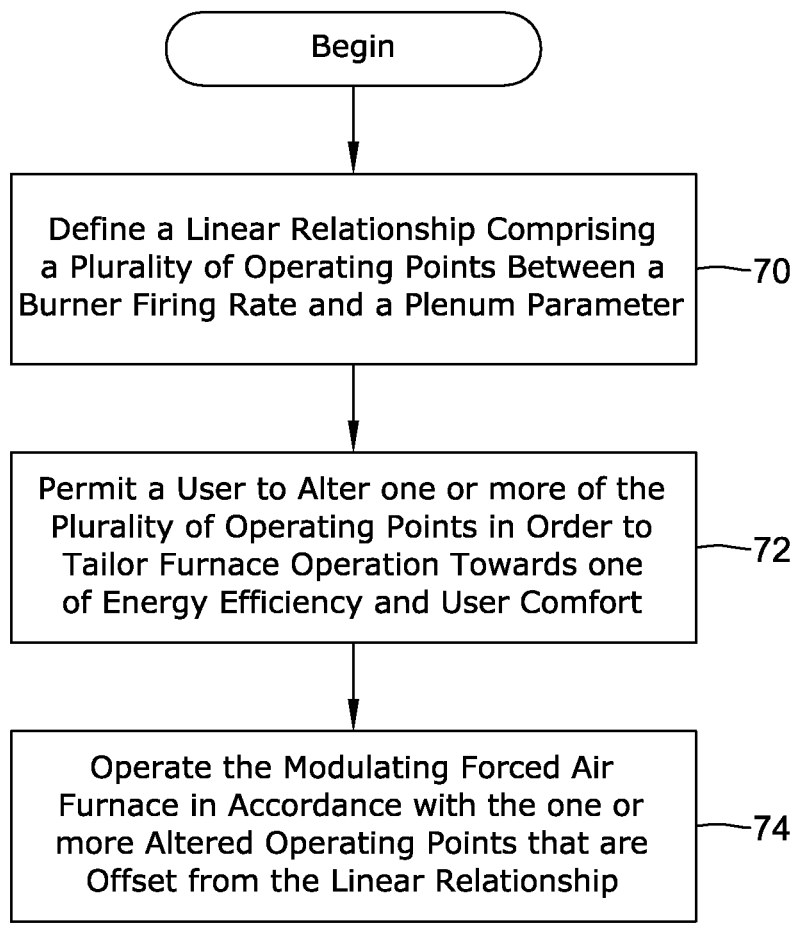

Turning now to FIG. 6, control begins at block 70, where a linear relationship may be defined between a burner firing rate and a plenum parameter. The relationship may include a plurality of operating points. In some instances, the plenum parameter may be a discharge air temperature (DAT) or a discharge air flow (DAF) measurement, although this is not required. In some cases, the relationship may be programmed or otherwise entered into controller 42 (FIG. 1).

At block 72, a user is permitted to alter one or more of the plurality of operating points in order to tailor operation of furnace 10 (FIG. 1) towards either energy efficiency or user comfort. In some instances, as noted above, optimizing energy efficiency may require some sacrifice of user comfort, and vice versa. In some cases, a user may individually select particular operating points to alter, or may choose between energy efficiency and user comfort, and controller 42 (FIG. 1) may determine how to alter the individual operating points (or a general relationship between firing rate and plenum parameter).

Control passes to block 74, where furnace 10 (FIG. 1) is operated in accordance with the one or more altered operating points that are offset or otherwise altered from the linear relationship. As discussed above, this may mean operating circulating blower 22 (FIG. 1) at a speed that is higher or lower than a speed at which circulating blower 22 would otherwise operate at for a given firing rate. As discussed above, in some instances circulating blower 22 may be held at a particular speed while the firing rate of burner 12 (FIG. 1) is altered. In some cases, both circulating blower speed and burner firing rate are altered.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A method of operating a modulating forced air furnace, the method comprising the steps of:
    accessing a defined relationship between a circulating blower speed and a plenum temperature, wherein the plenum temperature has a non-constant relationship with the circulating blower speed over at least a range of circulating blower speeds;
    operating the modulating forced air furnace in accordance with the defined relationship between the circulating blower speed and the plenum temperature such that a substantially non-constant plenum temperature is produced over at least a range of circulating blower speeds.

2. The method of claim 1, wherein operating the modulating forced air furnace in accordance with the defined relationship between a circulating blower speed and a plenum temperature comprises adjusting a burner firing rate.

3. The method of claim 2, wherein operating the modulating forced air furnace in accordance with the defined relationship between a circulating blower speed and a plenum temperature further comprises adjusting the circulating blower speed.

4. A method of operating a modulating forced air furnace, the method comprising the steps of:
    allowing a selection of an efficiency/comfort setting;
    accessing a defined relationship between a burner firing rate and a plenum parameter, wherein the plenum parameter has a non-constant relationship with the burner firing rate over at least a range of burner firing rates, and wherein for a given burner firing rate, the corresponding plenum parameter is dependent upon the selected efficiency/comfort setting;
    operating the modulating forced air furnace in accordance with the defined relationship between the burner firing rate and the plenum parameter.

5. The method of claim 4, wherein operating the modulating forced air furnace in accordance with the defined relationship between the burner firing rate and the plenum parameter comprises controlling a circulating blower speed.

6. The method of claim 4, wherein the defined relationship between the burner firing rate and the plenum parameter comprises a linear relationship with a non-zero slope between the burner firing rate and the plenum parameter.

7. The method of claim 4, wherein the plenum parameter corresponds to a plenum temperature.

8. The method of claim 4, wherein the plenum parameter corresponds to a volumetric plenum air flow measurement.

9. A method of operating a modulating furnace comprising a variable rate burner, a variable rate circulating blower and a furnace controller, the method comprising the steps of:
   selecting between an energy efficiency setting and a user comfort setting;
   the furnace controller operating the modulating furnace in accordance with a predetermined algorithm, and the selected setting alters the predetermined algorithm;
   regulating a plenum parameter in accordance with the selected setting, wherein the plenum parameter is related to a discharge air temperature (DAT) of the modulating furnace; and
   wherein regulating the plenum parameter in accordance with the selected setting comprises operating the variable rate circulating blower and/or the variable rate burner in accordance with the selected setting.

10. The method of claim 9, wherein operating the modulating furnace in accordance with the predetermined algorithm comprises adjusting a speed of the variable rate circulating blower in order to obtain a plenum parameter that is related to a current firing rate of the variable rate burner.

11. The method of claim 10, wherein the speed of the variable rate circulating blower is adjusted in order to obtain a plenum parameter in accordance with a linear relationship between the plenum parameter and the current firing rate.

12. The method of claim 10, wherein operating the modulating furnace in accordance with the energy efficiency setting comprises operating the modulating furnace with a circulating blower speed profile that improves efficiency at the expense of user comfort.

13. The method of claim 10, wherein operating the modulating furnace in accordance with the user comfort setting comprises operating the modulating furnace with a circulating blower speed profile that improves comfort at the expense of energy efficiency.

14. The method of claim 9, wherein operating the modulating furnace in accordance with the predetermined algorithm comprises adjusting a firing rate of the variable rate burner in order to obtain a discharge air temperature (DAT) that is related to a speed of the variable rate circulating blower.

15. The method of claim 14, wherein operating the modulating furnace in accordance with the energy efficiency setting comprises operating the modulating furnace with a burner rate profile that improves efficiency at the expense of user comfort.

16. The method of claim 14, wherein operating the modulating furnace in accordance with the user comfort setting comprises operating the modulating furnace with a burner rate profile that improves comfort at the expense of energy efficiency.

17. The method of claim 9, wherein regulating the plenum parameter comprises regulating a plenum temperature or regulating a plenum volumetric air flow.

18. The method of claim 9, wherein selecting an energy efficiency setting or a user comfort setting comprises setting an input selector or making a software setting.

* * * * *